Nov. 13, 1956   F. K. H. NALLINGER   2,770,147
METHOD AND DEVICE FOR THE SHIFT CONTROL OF
DRIVES, PARTICULARLY OF MOTOR VEHICLE
DRIVES WITH A FLUID DRIVE
Filed April 22, 1950
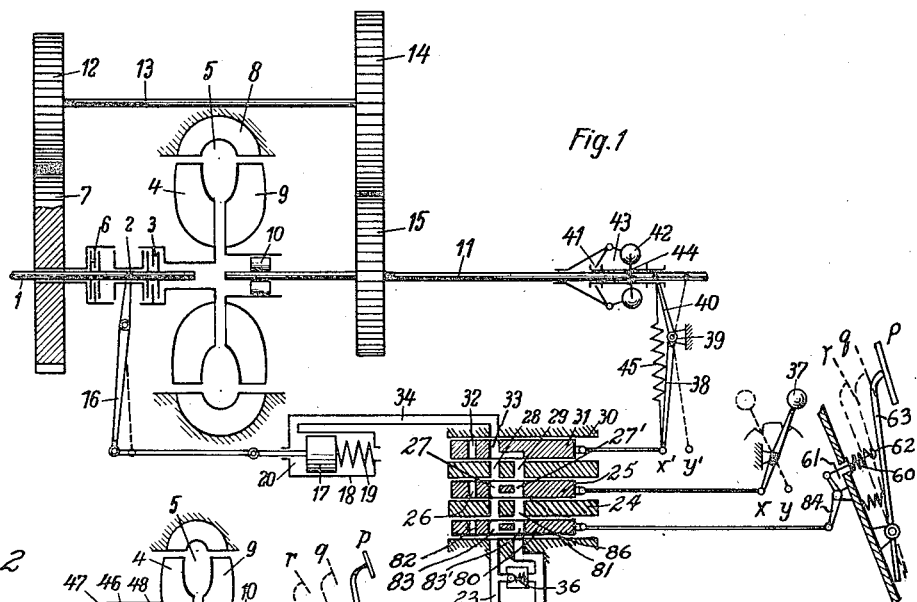
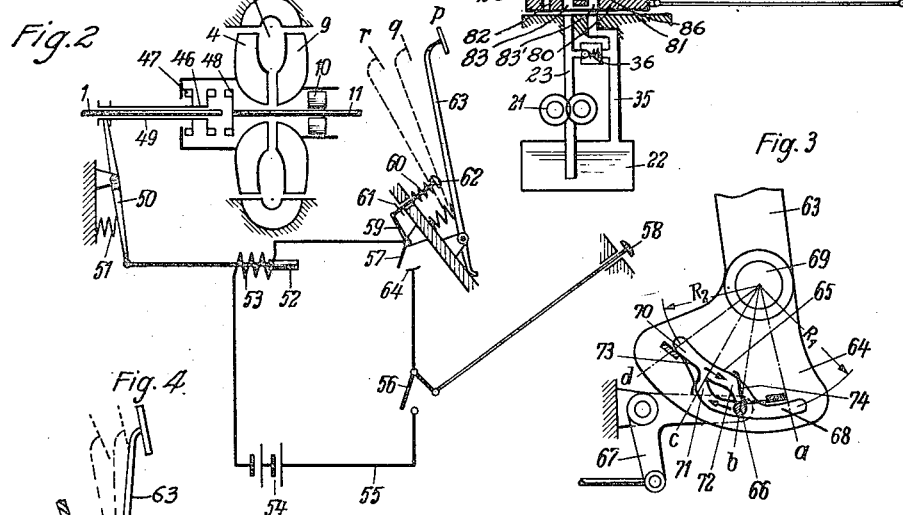
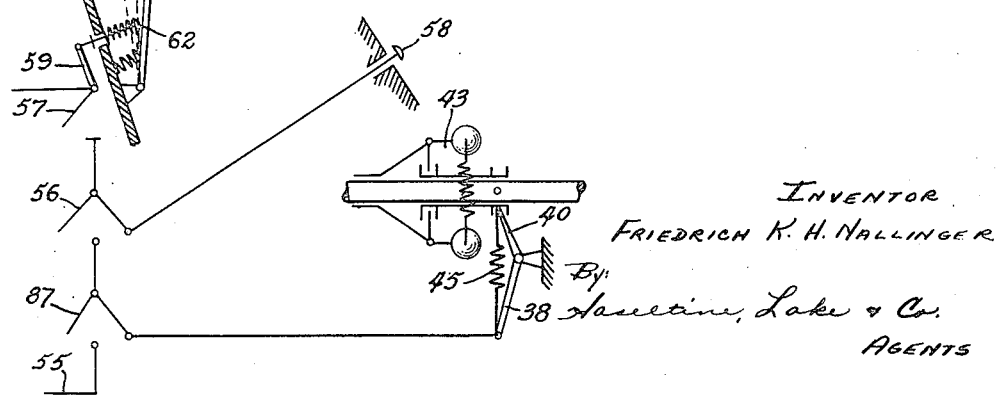
INVENTOR
FRIEDRICH K. H. NALLINGER
By: Haseltine, Lake & Co.
AGENTS United States Patent Office
2,770,147
Patented Nov. 13, 1956

2,770,147

METHOD AND DEVICE FOR THE SHIFT CONTROL OF DRIVES, PARTICULARLY OF MOTOR VEHICLE DRIVES WITH A FLUID DRIVE

Friedrich K. H. Nallinger, Stuttgart, Germany, assignor to Daimler-Benz Aktiengesellschaft, Stuttgart-Unterturkheim, Germany Application April 22, 1950, Serial No. 157,450

Claims priority, application Germany April 29, 1949

7 Claims. (Cl. 74—472)

This invention relates to a method and device for the shift control of drives and more particularly to shift controls adapted for use in motor vehicle drives having a fluid drive (hydrodynamic gear or couplings).

Objects of the present invention are preferably to provide shift controls which are particularly adapted for use in connection with a fluid drive to thereby attain improved efficiency of the drive. Furthermore, to provide simple, suitable shift controls for the engagement or disengagement of such drives.

Fluid drives have the advantage that the torque transmitted by them has great abilities of accommodation, adjusting itself to the R. P. M. and (in vehicles) to the road speed, whereby smooth starting of the vehicle from a standstill and flexibility of operation is assured. However, they have the characteristic property that their efficiency is relatively high (about 90%) only within a limited range and when this range is passed it gradually decreases. Therefore, fluid drives for motor vehicles have already been provided with mechanical coupling devices which permit the connecting of the drive shaft and the driven shaft of the fluid drive directly with each other by providing a by-pass for the same.

In contradistinction to the above an important feature of the invention consists in a method of shift control or in a shift device wherein the fluid drive is effective within a definite range of control, by way of example, in a lower power or speed range of the vehicle drive and wherein dependent upon the respective R. P. M. a transmission of power takes place or may take place by by-passing the fluid drive within the further range of control. The shift from fluid drive to by-pass drive may suitably be accomplished automatically as well as manually at the will of the driver. Particularly, by-passing of the fluid drive can be made dependent upon reaching a definite range of control and upon simultaneous actuation of the control for the power source.

The employment of such a shift control brings forth the result that the advantages of the fluid drive can be utilized and a high drive efficiency is made attainable at the same time.

In order to obviate the frequent engagement and disengagement of the fluid drive in the vicinity of the control limit which determines the automatic shift control, the automatic re-engagement of the fluid drive suitably takes place at another control moment (accordingly, for example, at a lesser road speed) than that of the automatic disengagement of the fluid drive (effect of hysteresis).

Disconnection or disengagement and engagement of the fluid drive can be made perceptible for the driver by means of a point of resistance (for example, at the accelerator pedal).

The by-pass drive may be established by a direct connection of drive shaft and driven shaft of the fluid drive, or also by means, for example, of a mechanical transmission. As the by-pass drive is engaged the fluid drive is suitably disconnected from the vehicle by means of a free wheel clutch, and, if necessary, a counter-free wheeling unit may be provided for the by-pass drive.

The passage from fluid drive to by-pass drive and vice versa may be accomplished directly, for example mechanically, or by an auxiliary force, for example by hydraulic, pneumatic or electrical means.

In the accompanying drawing several embodiments of the invention, for example for a motor vehicle, are illustrated schematically by way of example, wherein—

Fig. 1 is a diagram of the shift controls of a fluid drive employing a hydraulic auxiliary force, the shift being accomplished dependent upon the R. P. M. of the driven shaft i. e. upon the road speed, Fig. 2 a diagram of shift controls with electrical actuation operated from the accelerator pedal, Fig. 3 an especially developed shift device adapted for use in connection with the accelerator pedal or another control lever, and Figure 4 an alternative of the form shown in Figure 2 with simultaneous dependence of shifting upon the R. P. M. of the motor.

In Fig. 1 the coupling sleeve 2 of a change-over clutch is slideably, but not rotatably, supported on a drive shaft 1, which sleeve may connect the shaft 1 either by means of a clutch 3 to the pump wheel 4 of a fluid drive 5, or by means of a clutch 6 to the gear wheel 7. The pump wheel 4 of the fluid drive 5 drives the rotor wheel 9 via a stationary blade wheel 8. The rotor wheel 9 is in coupling connection with the driven shaft 11 by means of a free wheel clutch 10 in such a manner that as the rotor wheel 19 is driven, the shaft 11 is engaged and rotated by the friction of the free wheel clutch 10, whereas the free wheel clutch idles if the shaft 11 rotates at a higher speed than that of the rotor wheel 9, for example, as the shaft 11 is driven through the gears 7, 12, countershaft 13 and the gears 14, 15. The gear wheel 15 may, eventually, be disengaged from the shaft 11 by means of a clutch which, for example, is disengageable with the clutch 6.

The change-over clutch 2 is operated by a lever 16 which is actuated by a piston 17. The latter slides in a cylinder 18 and is moved toward the left by means of a spring 19 and toward the right, against the action of the spring, by the pressure eventually built up in the fluid chamber 20. The pressure of the liquid is built up by a pump 21 which draws the liquid, for example oil, from the reservoir 22 and delivers it through a conduit 23 to the cylinder 24. In the cylinder 24 moves a slide valve 25 which has a transverse bore 26 and two more transverse bores 27 and 27' which are in communication with each other by longitudinal grooves 27. Two more conduit sections 28, 29 branch off from the cylinder 24 and lead to a second control cylinder 30. A conformable control valve 31 is slidingly supported in the latter and has a first transverse bore 32 and also a second transverse bore 33 provided with a longitudinal groove 31'. A conduit 34 leads from the cylinder 30 to the cylinder 18 which is provided with a sliding piston 17. A return conduit 35 establishes communication between control cylinder 24 and oil reservoir 22, and a relief valve 36 arranged in a transverse conduit 36' between the lines 23 and 35 bypasses any excess of liquid above that required and returns it through the line 35 to the oil reservoir 22.

The sliding control valve 25 is linked to a lever 37 which, for example, may be arranged at the driver's seat and be placed in either of positions x and y. Likewise the sliding control valve 31 is linked to a lever 38. The latter is fulcrumed at 39 and may also be placed in either one of the two positions x' and y'. The lever 40 supported at the same fulcrum point 39 is actuated by the governor sleeve 41 which on its part is actuated by the flyweights 42 against the action of a governor spring 44 of a governor 43 rotating with the driven shaft 11. The levers 38 and 40 are connected with one another by a tension spring 45 in the manner of a knee-joint, so that as the governor sleeve 41 is moved by the action of the flyweights 42, the spring 45 is swung beyond the fulcrum point 39 and therewith beyond the dead-center or alignment positions of the levers 38, 40 whereby the lever 38 is swung in the one or the other direction.

The slide valve 25 is preceded by a further similarly shaped slide valve 80 in a cylinder 81, slide valve 80 having a control bore 82 and intercommunicating bores 83 and 83' and being connected by lever 84 with a stop 62. The stop 62 is urged outwardly by a spring 60 into engagement with an abutment 61 and is pressed inward against the spring 60 by the gas pedal 63 as soon as the pedal is depressed from the coasting position $p$ beyond the fully open throttle position $q$. When the pedal 63 occupies the end position $r$, the slide valve 80 is at its extreme right hand position where the bore 82 communicates with the pressure conduit 23 and with the conduit 85 while the bore 83 establishes a direct communication between the conduits 35 and 86.

The shift control arrangement illustrated in Fig. 1 is shown in the position at which the motor car is set in motion from a standstill. The engine is started and begins to rotate the shaft 1. The hand lever 37 is at first in the position $x$, the flyweights 42 of the governor 43 are in their respective positions of rest. Consequently, the governor sleeve 41 and therewith the lever 40 are in the left-hand end position, likewise also the lever 38 (position $x'$) being under the action of the spring 45. Accordingly, the two sliding valves 25 and 31 are moved into their left-hand end position wherein although the conduit 34 is in communication with the conduit 23 through the transverse bores 27 and 33 these conduits 23 and 34 at the same time are also in communication with the return conduit 35 through the longitudinal grooves 27" and 31' in the slide valves. Consequently, the pump 21, which, for example, is driven by the drive shaft 1 or another suitable shaft, passes the oil through the longitudinal grooves 27" and 31' in the slide valves 25 and 31 back into the return conduit 35, so that no pressure can be built up in the chamber 20. Consequently, the piston 18 due to the action of the spring 19 is moved toward the left and the clutch 3 engaged. The drive shaft 1 then, drives the pump wheel 4 of the fluid drive 5 via the clutch 3 and the pump wheel 4 transmits the motion via the rotor wheel 9 and free wheel clutch 10 to the driven shaft 11.

When the motor car attains a higher speed and therewith the drive shaft 11 a higher number of revolutions then, at a definite set speed of R. P. M. ($n_1$) or a definite road speed ($v_1$), the flyweights are swung outward. This outward movement takes place on the one hand against the action of the spring 44 and on the other hand against the action of the spring 45, the tension of the latter being more and more increased as the governor sleeve is moved toward the right until the spring has passed through and beyond the fulcrum point 39 of the levers 38 and 40. At this moment the spring 45 swings the lever 38 counterclockwise, so that it moves from the position $x'$ into the position $y'$. Therewith the control valve 31 is moved from its left-hand end position into its right-hand end position. The transverse bore 32 brings then the conduit section 28 into communication with the conduit 34, whereas the transverse bore 33 is only in communication with the conduit section 29 yet. However, since (supposing that the lever 37 is in the position $x$ indicated in the drawing) the oil can flow from the conduit 23 via the longitudinal grooves between the transverse bores 27 and 27' in the control valve 27 back into the return conduit 35, even now no pressure can be build up in the cylinder space 20 for the piston 17. Consequently, the clutch 3 and therewith the fluid drive 5 remain steadily engaged as long as the lever 37 is in the position $x$.

If, however, the fluid drive is to be disconnected and the by-pass drive to be engaged through the gears 7, 12, 14, 15, then the driver has to shift the hand lever 37 from the position $x$ into the position $y$, and also depress the gas pedal 63 beyond the position $q$ to the position $r$. As long as the lever 38 remains in the position $x'$, the control valve therefore in the shown position, the shifting of the lever 37 has no effect at all, since the oil can flow back into the conduit 35 through the longitudinal groove in the slide valve 31. The same applies for gas pedal 63 and slide valve 80. However, as soon as in this case (that is, at a position $y$ of the lever 37) the governor 43 shifts the lever 38 from $x'$ to $y'$ and the gas pedal from $q$ to $r$, the communication between conduit 23 and return conduit 35 is also definitely disconnected via the control valve 31, so that the pressure line 23 is only in communication yet with the chamber 20 for the piston 17 via the transverse bores 26 and 32 in the slide valves 25 and 31. The pressure build up by the liquid, therefore, pushes the piston 17 toward the right against the tension of the spring 19 until the piston is in its right-hand end position. When the piston has reached this position the oil flows either via the relief valve 36 or via a (not shown) return line, controlled by the piston 17, back into the reservoir 22. Shifting the piston 17 toward the right actuated the change-over clutch 2 whereby the clutch 3 was disconnected and the clutch 6 engaged. The power is now transmitted from the drive shaft 1 through the gears 7, 12, 14, 15 to the driven shaft 11. The fluid drive, having been disconnected from the drive shaft 1 by the release of the clutch 3, being also disconnected from the driven shaft 11 by the release of the free wheel clutch 10.

If the lever 37 is brought into the position $y$ only after the governor 43 has come into action, then the passage from fluid drive to direct by-pass drive takes place only at the moment when the lever 37 is shifted, that is, accordingly, at a drive shaft R. P. M. above ($n_1$) respectively at a road speed above ($v_1$). Consequently, at a speed above ($n_1$) respectively ($v_1$) the driver is at liberty to determine the moment of change-over at will, provided, of course, that he did not place the lever 37 into the position $y$ at the start.

When the vehicle speed decreases and therewith also the speed of the shaft 11, then the flyweights 42 under the action of the spring 44 will have the tendency to return to their original position. However, in this case, the action of the spring 44 is opposed by that of the spring 45, so that due to the counter-action of the spring 45 the return of the flyweights to their original position respectively the change-over of the lever 38 from the position $y'$ into the position $x'$ can only take place at a speed (for example, $n_2$) respectively road speed (for example, $v_2$) which lies below such a speed of R. P. M. ($n_1$) respectively such a road speed ($v_1$) at which the outward movement of the flyweights 42 and the shift of the lever 38 from the position $x'$ into the position $y'$ has taken place. Depending on the selection of the calibration of the spring pressure, the difference of the two R. P. M. ($n_1$—$n_2$) respectively two vehicle speeds ($v_1$—$v_2$) accordingly, the hysteretic effect of the control can be accommodated to the actual requirements.

By the passage of the lever 38 into the position $x'$ communication is again established between the conduits 23 and 35 via the longitudinal groove adjoining the transverse bore 33, so that the oil flows back into the reservoir and there is no pressure anymore in the cylinder space 20 and the piston 17 in sequence is shifted into its left-hand end position by the action of the spring 19. The clutch 6 in sequence is disconnected, and the clutch 3 and therewith the fluid drive re-engaged.

Thus it will be clear that if the lever 37 remains steadily in the position $x$ and is not touched, the power also is constantly transmitted through the fluid drive 5. In this case an automatic engagement of the by-pass drive by way of the gears 7, 12, 14 and 15 cannot take place. When the lever 37 is steadily in the position $y$, the passage from fluid drive to by-pass drive takes place at the higher speed of R. P. M. ($n_1$) and the re-engagement (corresponding to the chosen hysteresis) at the lower speed of R. P. M. ($n_2$). Consequently, depending on the position of the lever 37, the driver may operate the vehicle either only with the fluid drive (position $x$) or with automatic shift control between fluid drive and by-pass drive (position $y$) or he may also shift to by-pass drive above ($n_1$) respectively re-engagement above ($n_2$) at will. If it is desired to forego the possibility of driving with the fluid drive only, or the possibility of a manual shift at the will of the driver, then the lever 37 and the slide valve 25 may be omitted.

In the embodiment according to Fig. 2 a change-over clutch 46 (in this case developed as claw clutch) is arranged on the drive shaft 1. This clutch through its claws 47 either may connect the drive shaft 1 to the pump wheel 4 of the fluid drive 5, or the drive shaft 1 through the claws 48 directly to the driven shaft 11, so that a direct drive from the drive shaft 1 to the driven shaft 11 is established. Instead of a fluid drive, a fluid coupling may, eventually, be provided for; in this case the free wheel clutch 10 may be omitted.

The control sleeve 49 of the change-over clutch 46 is operated by a double lever 50 which on the one hand is under the pressure of a spring 51 and on the other hand linked to a solenoid core 52 which is pulled toward the left by a coil 53 against the pressure of the spring 51 when the coil 53 is supplied with current from the power source 54. In the circuit 55 of the power source are, for example, two switches 56 and 57. The switch 56 may be closed by means of a pull member 58, for example, by pulling the same from the driver's seat. The switch 57 is actuated by a lever 59 connected to a control button 62 which is under the pressure of a spring 60 and provided with a counterstop 61. The control button 62 located within the range of the accelerator or gas pedal 63 is so adjusted that the latter may be depressed in the first part of its travel from $p$ to $q$ without touching the spring loaded control button 62 but in its further travel from $q$ to $r$ it will also depress the control button 62. In the position $q$ the accelerator pedal 63 touches the control button 62 but the tension of the spring tends to oppose a further travel, consequently this point of resistance is clearly perceptible by the driver. As the accelerator pedal is depressed from $q$ to $r$ the switch lever 57 establishes contact with the contact member 64 and as a necessary result (with the switch 56 closed) the power circuit is closed and a current flows through the coil 53. The solenoid core 52 is drawn toward the left, the lever 50 swung about its fulcrum point against the pressure of the spring 51 and the change-over clutch 46 brought into its other end-position; that is, the fluid drive 5 disconnected and the drive shaft 1 connected directly to the driven shaft 11.

It stands to reason that a gear transmission may just as well be provided for the case of Fig. 2 as for the case of Fig. 1. Likewise, the control member 58 corresponding to the lever 37 may also be omitted in the embodiment according to Fig. 2. Friction, synchronizing, electromagnetic or other types of clutches or their equivalents may also be provided instead of a claw clutch 46. Instead of the accelerator pedal, the switch 57 may also be actuated by a conventional speed governor (for example, 43).

In order to render it possible to make the engagement of the fluid drive also dependent upon the position of the gas pedal with hysteretic effect, a device as shown in Fig. 3 may be employed. The accelerator or another control lever has a second lever 64 with a slotted gate 65 which serves as guide for the pin 66 of a lever 67 for the switch 57 or the control valve 31 (which, therefore, is operated by the accelerator pedal) or for another control member. The gate slot 65 in its right-hand portion 68 has a contour which follows a radius $R_1$ and in its left-hand portion 70 a contour which follows a radius $R_2$ about the fulcrum point 69 of the accelerator pedal. The gate slots 68 and 70 are connected with each other by two inclined slots 71 and 72, the connecting slot 71 being protected toward the slot 70 by a resilient member, for example, a leaf spring 73 and the connecting slot 72 by a corresponding resilient member 74 toward the slot 68.

The letter $a$ be representative of the relative position of the pin 66 in the gate at idling speed and the letter $b$ be representative of its relative position at full load. When the accelerator pedal is depressed from an idling start, consequently, the lever 64 with the gate 65 is swung counter-clockwise about the fulcrum point 69, then the pin 66 as it leaves the slot portion 68 is prevented from entering the slot 72 by the spring 74 and, therefore, guided to the slot portion 71 from thence by pushing aside the spring 73 it may enter the slot portion 70. When passing through the slot 71 (for example, into the position $c$ of the pin 66) the lever 67 is swung counter-clockwise whereby the hereinbefore described change-over of the drive takes place. Conversely, as the accelerator pedal 63 is released the pin 66 is prevented by the spring 73 from entering the slot portion 71 and guided into the slot portion 72 and from thence by pushing aside the spring 74 is passes into the slot portion 68. Hereat (for example, at the position $b$ of the pin 66 in the gate slot the passage from by-pass drive to fluid drive takes place, therefore, only at a power demand corresponding to the position below $c$. The pressure of the springs 73 and 74 upon the pin 66 suitably becomes effective at the moment of change-over respectively shortly before it, so that the driver, to whom this pressure is perceptible as increased resistance, will know exactly when the passage takes place.

Figure 4 differs from Figure 2 in that a further switch 87 is inserted in the circuit 55 which is actuated by a governor 43 similar to that of Figure 1 through a snap-action mechanism 38, 40, 45. A predetermined, relatively high R. P. M. of the driven shaft must, therefore, be reached before the direct drive coupling 46, 48 can be engaged.

It will be obvious to those who are familiar with such matters that the details of construction may be varied from those shown by me and yet the essentials of the invention be retained. I therefore do not limit myself to such details.

What I claim is:

1. A drive mechanism for a vehicle comprising a driving member, a driven member, a fluid drive arranged between the driving and driven members, a driving branch by-passing the fluid drive, a shifting device for engaging and disengaging the driving branch, a control mechanism responsive to the speed of rotation at one point of the drive mechanism, a further control mechanism actuatable by the operator in the control of the vehicle, a shifting member for each control mechanism, a third control mechanism manually actuatable, a third shifting member, each control member having a predetermined control position, and means actuatable by the three shifting members to influence the shifting device to engage said driving branch only when all three control mechanisms have exceeded the predetermined control position and the shifting mechanism is not engaged if at least one of the three control mechanisms remains below said control position.

2. A driving device according to claim 1 wherein the second mentioned control mechanism comprises a control member controlling the driving performance, the first mentioned control mechanism comprises a speed governor and the third mentioned control mechanism comprises a selectively operative shifting member.

3. A driving device according to claim 1, wherein said actuating means comprises an electric circuit, shifting means for said shifting device actuated by said electric circuit whereby said shifting device is engaged by said shifting means when a current flows through said circuit, a switch in said electric circuit actuated by the shifting member of said first control mechanism, a switch arranged in series with said switch in said electric circuit and actuated by the shifting member of said second control mechanism, said switches in each respective case being closed only when said last-mentioned mechanisms each have passed said control position, whereby said electric circuit can be supplied with current only when both of said mechanisms have passed the respective control position, and wherein the second mentioned control mechanism is selectively actuatable by the driver.

4. A driving device according to claim 1, wherein said actuating means comprising an electric circuit, shifting means for said shifting device actuated by said electric circuit whereby said shifting device is engaged by said shifting means when a current flows through said circuit, a switch in said circuit actuated by the shifting member of said first mentioned control mechanism, a second switch arranged in series with said first switch in said circuit and actuated by the shifting member of said second mentioned control mechanism, and a third switch in series with said first and second switches and actuated by said third shifting member of said third control mechanism whereby each of the three switches is closed when the appertaining control mechanism has exceeded the predetermined control position thereby to close the circuit only when all three mechanisms have exceeded said predetermined control position.

5. A driving device comprising an engine actuated drive member, a driven member, speed responsive means coupled to said driven member, a fluid drive for a lower speed range arranged between said two driving and driven members, a driving branch for a higher speed range bypassing said fluid drive, a shifting device for the engagement and disengagement of said driving branch, a control device coupled to said speed responsive means and operative upon said shifting device dependent upon the speed of said driven member, a further control device controlling the power output of the engine, each of said control device and said further control device having a predetermined control position, and means controlled by said control device and said further control device for actuating said shifting device to keep said driving branch bypassing said fluid drive disengaged by said shifting device below a definite speed and for tending to engage said driving branch by said shifting device above said definite speed, said last-named means being operative to actuate said shifting device to engage said driving branch only if both said control device and said further control device exceed said predetermined control position, one of said control devices including control means for causing actuation of said shifting device by said last-mentioned means during the passage from said lower speed range into said higher speed range at a higher R. P. M. than during the passage from said higher speed range into said lower speed range.

6. A driving mechanism comprising a driving member, a driven member, a fluid drive arranged between said driving and driven members, a driving branch by-passing the fluid drive and comprising a countershaft and drive transmission means between the driving member and countershaft and between the countershaft and driven member, a shifting mechanism for engaging and disengaging the driving branch, a control mechanism actuatable by the operator in the control of the vehicle, and means responsive to the control mechanism for influencing the shifting mechanism to remain inactive below a predetermined driving condition with the driving branch disengaged and to become active at and above said predetermined driving condition with the driving branch engaged.

7. A driving mechanism comprising a driving member, a driven member, a fluid drive arranged between said driving and driven member, a driving branch by-passing the fluid drive and comprising a countershaft and drive transmission means between the driving member and countershaft and between the countershaft and driven member, a shift device for engaging and disengaging the driving branch, a control mechanism actuatable in response to driving conditions, a further control mechanism to control the actuation of said shift device constructed and arranged to cause actuation of said shift device only when both said control mechanisms have moved from a position of rest to a predetermined control position.

References Cited in the file of this patent

UNITED STATES PATENTS

| Number | Name | Date |
|---|---|---|
| 1,900,119 | Lysholm | Mar. 7, 1933 |
| 2,014,944 | Martyrer | Sept. 9, 1935 |
| 2,120,734 | Cotal | June 14, 1938 |
| 2,120,896 | Koeppen et al. | June 14, 1938 |
| 2,170,649 | Banker | Aug. 22, 1939 |
| 2,205,794 | Jandasek | June 25, 1940 |
| 2,226,802 | Black | Dec. 31, 1940 |
| 2,302,714 | Pollard | Nov. 24, 1942 |
| 2,322,479 | Schjolin | June 22, 1943 |
| 2,380,677 | Schjolin | July 31, 1945 |
| 2,454,614 | Peterson | Nov. 23, 1948 |
| 2,466,206 | Carnagua | Apr. 5, 1949 |
| 2,627,189 | McFarland | Feb. 3, 1953 |